E. W. SIEMENS & C. L. FRISCHEN.
Electric Railway Signaling-Apparatus.

No. 161,561. Patented March 30, 1875.

Witnesses
R. R. Baelz
E. C. Fitler

Inventors
Ernst W. Siemens
Carl L. Frischen
by Bakewell & Kerr
Attys.

E. W. SIEMENS & C. L. FRISCHEN.
Electric Railway Signaling-Apparatus.

No. 161,561. Patented March 30, 1875.

FIG. 2

Witnesses
R. R. Baelz
E. C. Fitler

Inventors
Ernst W. Siemens
Carl L. Frischen
by Bakewell & Kerr
Attys

THE GRAPHIC CO.PHOTO-LITH.39 & 41 PARK PLACE,N.Y.

E. W. SIEMENS & C. L. FRISCHEN.
Electric Railway Signaling-Apparatus.

No. 161,561. Patented March 30, 1875.

Fig. 3

Witnesses
K. R. Baelz.
E. C. Fitler.

Inventors
Ernst W. Siemens
Carl L. Frischen
by Bakewell & Kerr
Attys 7 Sheets--Sheet 5.

E. W. SIEMENS & C. L. FRISCHEN.
Electric Railway Signaling-Apparatus.

No. 161,561. Patented March 30, 1875.

E. W. SIEMENS & C. L. FRISCHEN.
Electric Railway Signaling-Apparatus.

No. 161,561. Patented March 30, 1875.

E. W. SIEMENS & C. L. FRISCHEN.
Electric Railway Signaling-Apparatus.

Patented March 30, 1875.

UNITED STATES PATENT OFFICE.

ERNST W. SIEMENS AND CARL L. FRISCHEN, OF BERLIN, GERMANY.

IMPROVEMENT IN ELECTRICAL RAILWAY-SIGNALING APPARATUS.

Specification forming part of Letters Patent No. 161,561, dated March 30, 1875; application filed August 18, 1874.

*To all whom it may concern:*

Be it known that we, ERNST WERNER SIEMENS and CARL LUDWIG FRISCHEN, both of Berlin, in the German Empire, have invented an Improved Electrical Apparatus for Signaling and Controlling the Points and Signals of Railways; and do hereby declare that the following description, taken in connection with the accompanying drawings hereinafter referred to, forms a full and exact specification of the same, wherein we have set forth the nature and principles of our said improvement, by which our invention may be distinguished from others of a similar class, together with such parts as we claim and desire to secure by Letters Patent—that is to say:

This invention relates to electrical apparatus whereby a signalman at a station on a line of railway can communicate with a signalman at another station, so as either to send or to receive information as to whether the line is clear or blocked, and thereby to be enabled to work or to direct the working of the necessary points and signals, so as to secure safety of traffic, the said electrical apparatus being capable of being connected to the points and standard signals of the railway in such manner that these shall, by the working of the apparatus, be locked in positions according with the signals transmitted or received by the apparatus, or unlocked when it is consistent with safety that they should be free. The apparatus, which will presently be described, is arranged to transmit communications by a single wire, the earth being employed for the return portion of the circuit, and the apparatus is worked by a number of successive alternating electrical currents, in such a manner that a single current or a few currents produce no appreciable effect on its indications, so that its proper working is guarded against the influence of accidental or defective currents or of atmospheric electricity.

The general principle according to which the apparatus is devised may be thus stated. A segment or semaphore-arm capable of being loaded, so that it will descend by its own gravity, or of being counterweighted, so that it will rise, is restrained from moving by the pallets of an escapement-anchor, which engage with teeth on the edge of the segment or arm. This anchor is connected to the armature of an electro-magnet, which is rendered active by electricity transmitted through its coils. A number of successive currents being transmitted, the armature and its anchor are caused to vibrate, and thus the arm or segment is permitted to move in obedience to its bias, step by step, from the position which indicates one signal—such as "danger" or "line blocked"—to that which indicates another signal, such as "safety" or "line clear." The ascending bias is given to the arm or segment by the signalman pressing a knob, whereby a weight or spring is brought to bear, so as to press the arm or segment upward, and the movement which thus sets the bias also works suitable commutators, whereby the line-wire is brought into connection with the required electro-magnets. When the segment or arm has to descend by its own weight the knob is not pressed, and the weight or spring is not brought to bear on the segment or arm, the commutators effecting other electrical circuits. The vibration of the armature and anchor, besides effecting the movement step by step of the indicating arm, also works the hammer of a bell, thereby furnishing the attendant with an audible alarm.

The portions of the apparatus referred to above are made in duplicate—one part for communication with the next station on the up line, or in the up direction, and the other for communicating with the next station on the down line, or in the down direction. The electric currents for both parts are produced by the rotation of a magneto-inductor, preferably constructed in the manner known as Siemens' revolving armature, which is made to rotate between the poles of permanent magnets by the signalman working a winch-handle, and which has the effect of producing at each revolution a positive and a negative current, so that the continued rotation of the armature produces a succession of alternating currents. Thus the signaling-instrument consists of one rotating magneto-inductor, or producer of electrical currents, and a pair of biased segments or arms and bells, with their electro-magnets and commutators, and with their knobs for giving the bias and setting the commutators.

In applying the apparatus to control points and signals, as well as to give visible and audible indications of the state of the traffic on the line, the knobs which bias the segments and set the commutators are made also to work pawls, which catch into notches on the rods or pulleys which move the points or signals, so that when these knobs are pressed down the point or signal is held by the pawl; or, should the point or signal not be in the proper position, the pawl, finding no notch to engage with, is prevented from moving, and thus the knob cannot be pressed down, and the apparatus cannot be worked as desired, till the point or signal be first set right.

It may readily be understood that by repetition of the working parts the apparatus can be applied to the control of any number of points or signals; and as this control is effected by means of electrical currents which can be transmitted over great distances, the points and signals acted upon may be scattered over extended spaces—as, for example, in a station—and may be all brought under the control of a central set of apparatus, from which line-wires extend to the various points where switches and signals are most conveniently situated.

In order that the nature of our invention may be better understood, we will first explain the operation of the apparatus by reference to diagrams showing in an extended or developed form the connections of the various parts, without regard to constructive details, which we will afterward describe with reference to the drawings of the apparatus as it is actually constructed.

Figure 1:
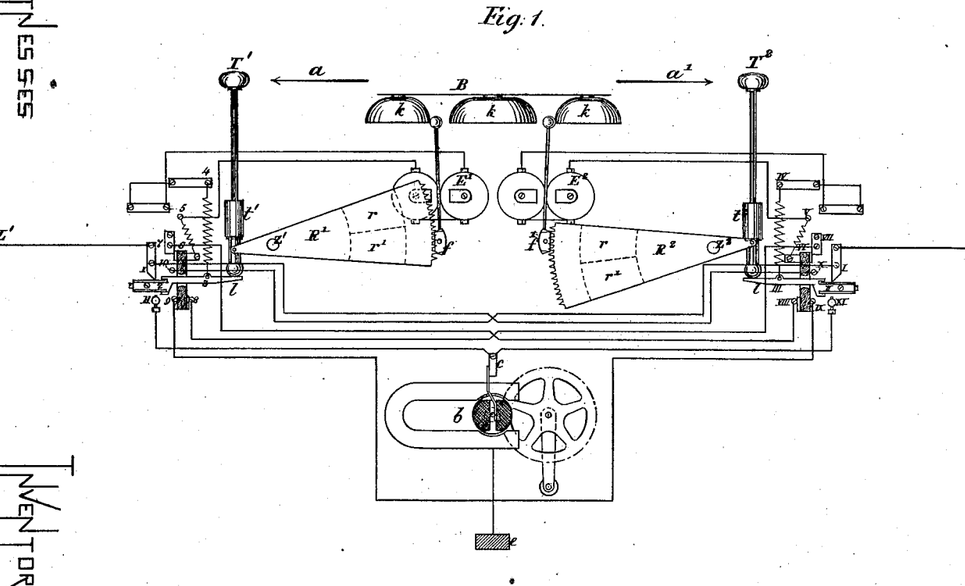
Figure 2:
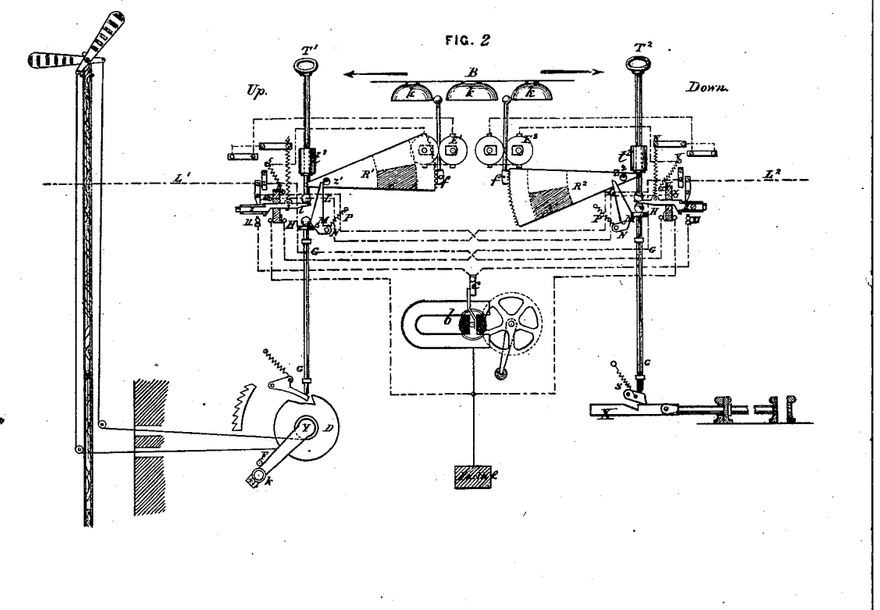

Figure 1, Sheet I, represents diagrammatically the arrangement of the apparatus for simply signaling from one station to another as to whether the line is clear or blocked. The greater part of it is in duplicate, as already explained, to communicate in both directions, as indicated by the arrows $a\, a'$, the one side serving to communicate down, and the other side up, the line. $b$ is the rotating producer or magneto-inductor, of known construction, consisting of a longitudinally-coiled cylindrical armature, made to revolve by a winch and multiplying-gear between the poles of permanent magnets, the coil on the armature being connected to earth at $e$, and to the wires of the apparatus at $c$. $R^1\, R^2$ are the two semaphore arms or segments, pivoted at $Z^1\, Z^2$, and having on their faces, at $r$ and $r'$, marks or colors indicating, respectively, "line clear" and "line blocked," or such other signals as may be determined on. These arms are placed behind screens having holes in them, through which the upper signals $r$ are visible when the arms are down, and the lower signals $r'$ are visible when the arms are up. On their peripheries the segments are provided with teeth, engaging with escapement-anchors $f f^1$, worked by the armatures of electro-magnets $E^1\, E^2$, the coils of which are connected to the wires of the apparatus. $T^1\, T^2$ are knobs on rods, on which are sliding weights $t^1\, t^2$. When either of the knobs $T^1\, T^2$ is pressed down the weight $t^1$ or $t^2$, bearing on the arm of the segment $R^1$ or $R^2$, counterweighs it, so as to give it a bias upward; but when the weight $t^1$ or $t^2$ is clear of the segment-arm, as shown on the left of the figure, the unsupported weight of the segment $R^1$ gives it a bias downward. In either case the segment is held by the anchor $f$ or $f^1$; but when that anchor is caused to vibrate by a succession of electric currents being passed through the coils of the magnet, $E^1$ or $E^2$, with which it is connected, it releases the segment tooth by tooth, and permits it to move upward or downward, as the case may be, in obedience to its bias. The vibrating armatures, besides working the anchors $f^1\, f^2$, work also the hammers of bells B, causing those hammers to vibrate between a central bell and a bell on either side thereof, so that while either of the segments is in motion the bells are caused to sound. The lower ends of the rods of the knobs $T^1\, T^2$ bear upon commutating-levers $l$, which make or break electrical contacts between the wires of the apparatus and line-wires $L^1\, L^2$, which, respectively, extend up and down the line to similar apparatus at distant stations.

In order that the nature of the commutation of currents effected by the depression of the knobs $T^1$ or $T^2$ may be better understood, various points in the circuits of the apparatus are marked on the left side with numbers, while the corresponding points on the right side are marked with corresponding Roman numerals, and the completion of the circuits may be explained by the following example: The attendant at the next station on the left depresses his right-hand knob, and works his inductor $b$, so as to send alternating positive and negative currents by the line-wire $L^1$, whence they pass by 1 2 3 4 to the coil of the magnet $E^1$, and thence, by 5, 6, 7, VIII, and IX, to earth at $e$. Thus, the left-hand bells are sounded, and the left-handed segment $R^1$ is permitted to descend step by step. If the right-hand segment $R^2$ were up, currents transmitted from the next station on the right would, in like manner, cause it to descend.

If, however, the right-hand segment $R^2$ be down, as shown in Fig. 1, the operator, by depressing the right-hand knob $T^2$, brings the weight $t^2$ to bear, so as to bias the segment $R^2$ upward, and at the same time he pushes down the lever $l$, so as to break the contact of I and II, and to make contact of II to IX. If he now works his inductor $b$, alternating currents will pass from earth $e$, through the coil of $b$, XI, III, and IV, through the coils of the right-hand magnet $E^2$, and by V VI X to 1, and the line $L^1$, to the next station on the left. Thus the right-hand segment at the operating-station will ascend step by step, and that at the next station on the left will be caused to descend. Thus the depression of the knob and the subsequent working of the inductor have the effect of altering the signal at the next station, so as, for example, to exhibit "line clear," and also altering that at the operator's own station to the opposite signal of "line blocked." Although we have thus described one kind of signaling operation effected by the apparatus, it is obvious that the signals and commutators might be arranged in various ways to suit various systems of signaling. By the arrangement which we have described, each instrument sends currents by the line opposite to that by which it receives currents. Thus, when the knob $T^2$ is depressed and the inductor $b$ worked, the currents are sent by the line-wire $L^1$, and when $T^1$ is depressed the currents are sent by $L^2$, the depression of the knob in either case not only setting the commutator for the transmission of the currents, but also giving the bias to the segment. Thus, when there are on a railway a number of successive stations, as, for example, in the direction of $L^2$, the attendant at the first station depresses $T^2$, and, working the inductor $b$, moves his own segment $R^2$ to indicate "line blocked," and moves the corresponding segment at the preceding station to indicate "line clear." The attendant at the next station operates in a similar manner, and so on in succession, so that a train is always signaled to stop at a station unless the attendant at the next station beyond (that is to say, the station toward which the train is proceeding) has removed the block-signal at the station which the train has reached. As the apparatus are in duplicate, their action, as above set forth, is available for trains proceeding in both directions.

In combining the signaling apparatus with the points and signals, electrical and mechanical connections are made between the electrical instruments and the point and signal apparatus, of such a kind as to effect their interlocking—that is to say, unless the electrical instrument is worked in a particular way the point or signal cannot be shifted, and unless the point or signal is in a particular attitude electric communication with the instrument is cut off. The nature of these connections will be understood on reference to the diagram, Fig. II, Sheet 3, which shows in a developed form the signaling apparatus above described, connected on the left side with a pair of standard signals, and on the right side with a point, as an illustration in a simple form of the manner in which the interlocking of points and signals with the electrical apparatus is effected. In this diagram the signaling portion of the apparatus corresponds with that shown in Fig. 1, and its parts are marked with the same letters as in that figure. The axes $Z^1 Z^2$ of the segments $R^1 R^2$ are partly cut away, so that when the segment and its axis are in one attitude, as $R^1 Z^1$, the end of a lever, L, is held by the solid part of the axis; but when the segment and its axis are in another attitude, as $R^2 Z^2$, the point of the lever L escapes through the cut part of the axis. Below the rods of the knobs $T^1 T^2$ are rods G, bearing at their lower ends upon spring-pawls $S^1 S^2$, which can engage with notches in the one case on the periphery of a disk, D, on the barrel Y, which works the standard signal in the other case on the face of the rod X, which works the points. When the rod X is in the position shown, its notch being removed from the pawl $S^2$, the rod G, and consequently the knob $T^2$, cannot be depressed. If, however, the point-rod X were moved so as to bring its notch under the pawl $S^2$, the rod G, and consequently the knob $T^2$, could be depressed; and as long as the rod G should remain down the point-rod X would be prevented by the pawl from being moved. In like manner the signal-pawl $S^1$, with its rod G and the knob $T^1$, can only be depressed when the disk D presents its notch to the pawl, and so long as the rod G is held down the disk D is prevented by the pawl from turning. On each of the rods G there is a collar, H, which bears against the inclined face of a lever, L, pivoted at M, and pressed toward the rod by a spring, P, acting on an arm, N, of the lever L. When, by the depression of the knob $T^1$, the rod G has been pushed down, the lever L is caused by its spring P to take the attitude shown on the left of the figure.

The segment $R^1$ and its axis $Z^1$, having then been moved so as to bring the solid part of the axis round behind the top of the lever L, holds the lever in that attitude, and the rod G is prevented from rising by its collar H bearing against the under edge of the lever L; but when the segment and its axis are turned, as $R^2 Z^2$ on the right of the figure, the point of the lever L escapes through the cut part of the axis $Z^2$, and the rod G is then free to be raised by the spring acting on its pawl $S^2$. It will thus be seen that, unless the point or the signal is in the proper position for the working of the signaling apparatus on the depression of the knob $T^1$ or $T^2$, depression cannot take place, and consequently the commutation of electrical currents that should be effected by that depression and the power of signaling to the distant station, are prevented; and when, on the other hand, the point or signal has been moved to the proper position and the knob has been depressed the point or signal is held by the pawl not only during the time that the knob is depressed and the signaling-instrument worked, but also until the segment $R^1$ or $R^2$, whose axis $Z^1$ or $Z^2$ catches the lever L, is turned from a distant station to the position at which the lever L can escape the axis.

Figure 3:
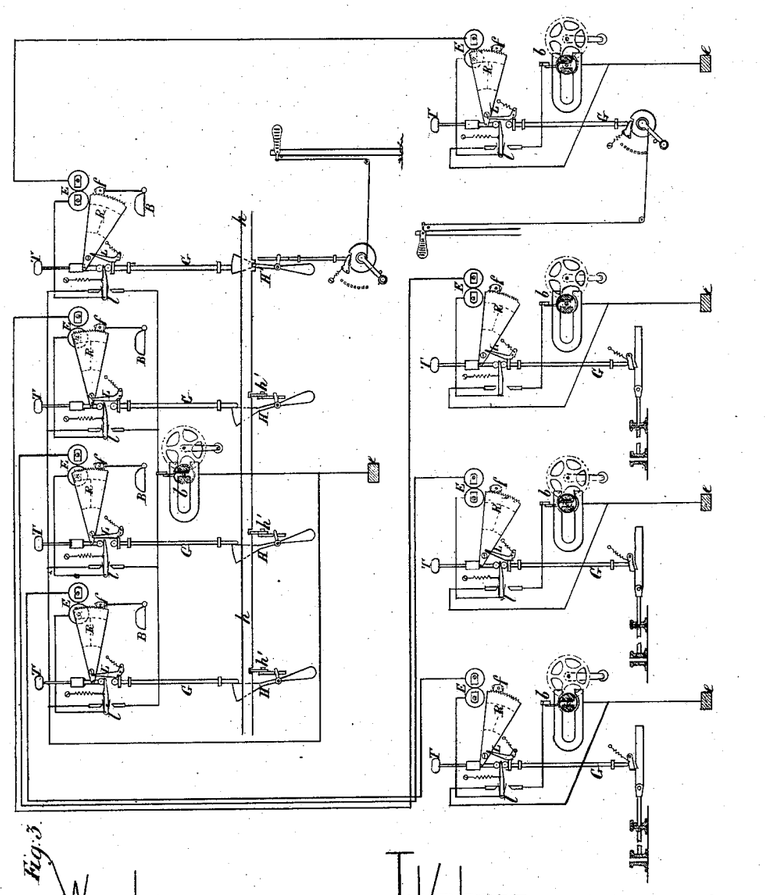

Fig. 3, Sheet III, shows diagrammatically how, by repetition in numbers of those portions of the apparatus which we have above described as only in duplicate, a number of points or signals can be brought under control. The points and signal indicated in the lower part of the figure are connected to their respective signaling-instruments in the manner already described. The corresponding instruments in the upper part of the figure are electrically connected to them, respectively, and each has its extended rod G, which, instead of bearing on a pawl, so as to lock a switch-rod or a signal-pulley, is made either to lock or to be locked by a segment-lever, H, which levers are interlocked with each other by means of a sliding bar, h, having projections h', for receiving bolts worked by the levers H. The first of the levers, H', is connected to the bar h, so that on moving H' the bar is caused to slide to the left.

In the condition in which the apparatus is shown in Fig. 3, the bar h is locked by its projections h' being stopped by the bolts of the levers H, and those levers are themselves locked by the rods G. When all the rods G are raised, the levers H, being freed, can be moved so as to withdraw their bolts from the projections h', and the bar h can then be made to slide by moving the lever H'; but then the rods G, resting on the circular tops of the levers H, as seen in the figure, (with respect to G', resting on H',) are locked, so that they cannot be pushed down; and, further, the rod G', when it is pushed down, forms a stop for the lever H' after it has been moved, in the same manner as the other rods G are shown in the figure, stopping the other levers H. The points and signal indicated in the lower part of the figure may be situated at considerable distances from the instruments shown in the upper part of the figure, being connected each to each by electric wires, and the system, though shown in the figure as applied to the control of three sets of points and one signal, may, by repetition of parts, be applied to any number of points and signals.

Having thus described the nature of, and mode of, operation with the improved apparatus which forms the subject of our invention, by reference to diagrammatic views, showing in a developed form the connections and relations of the various parts, we will now refer to figures which show the construction of apparatus or instruments for operating, in the manner set forth above, parts in the mechanism of those figures corresponding to parts shown in the diagrams, being marked with corresponding letters.

Figure 4:
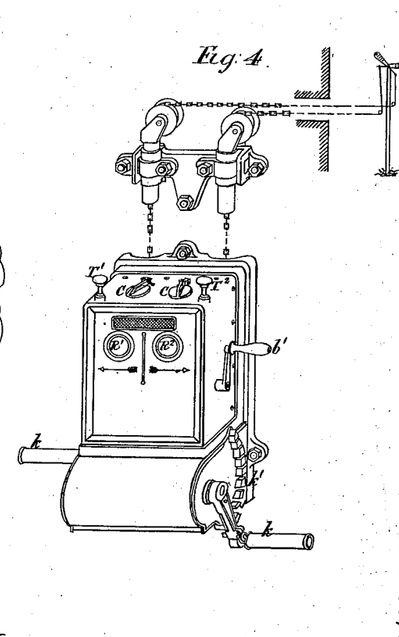
Figure 5:
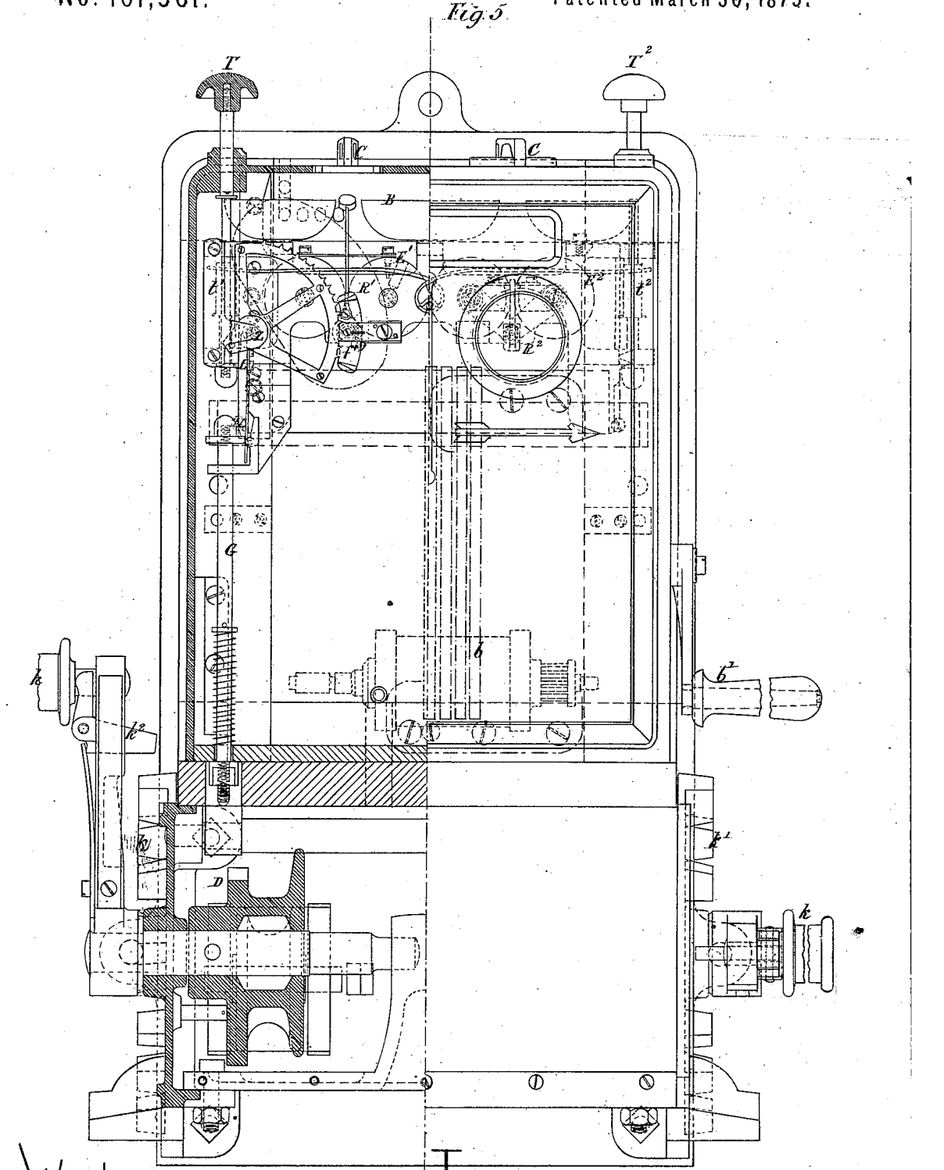
Figures 6, 9, 10, 11, 12:
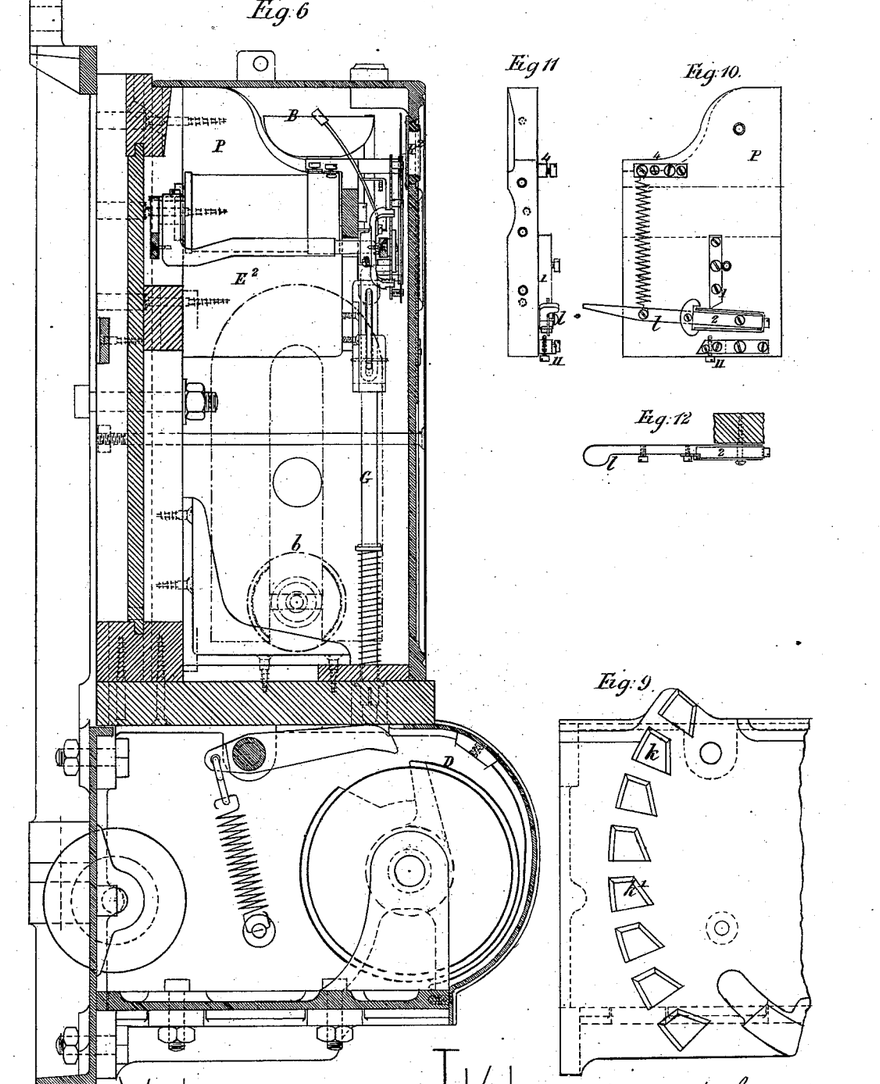
Figure 7:
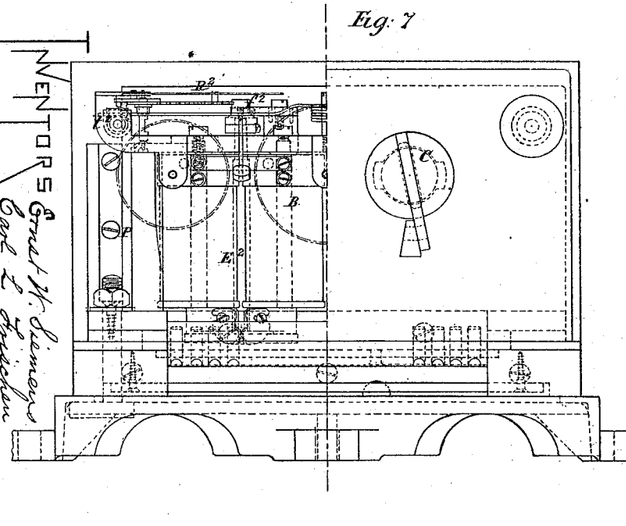
Figures 8, 13:
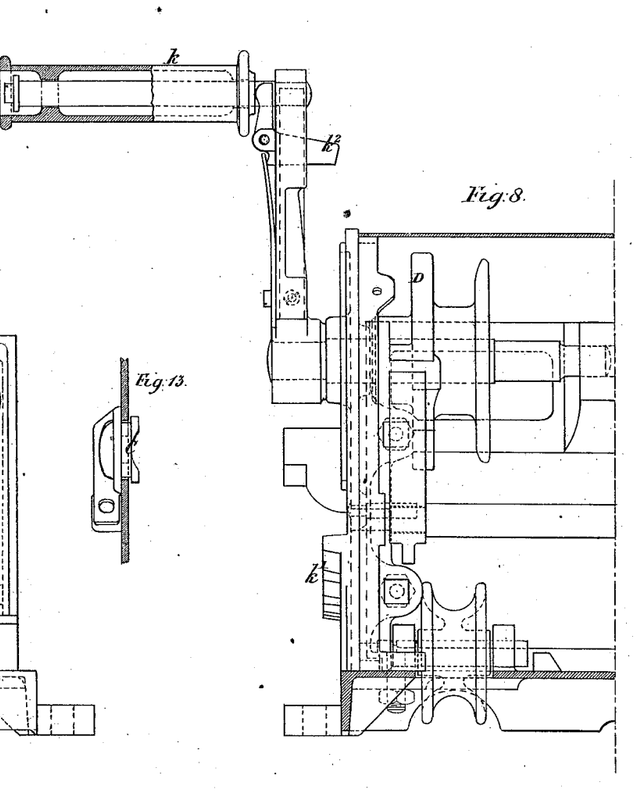
Figure 14:
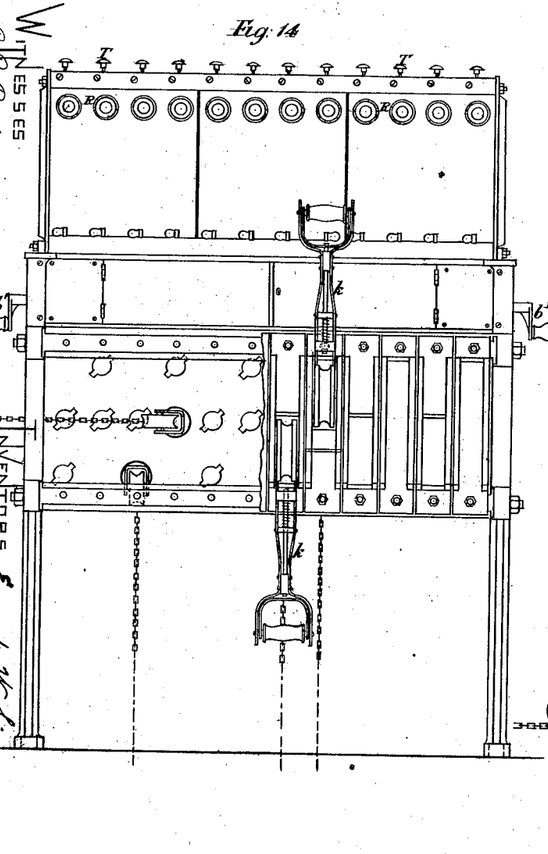

Fig. 4, Sheet VII, is a perspective view of an apparatus having two indicating-segments, seen through apertures $R^1$ $R^2$ in its casing, and connected with a pair of standard signals in a manner corresponding to that illustrated diagrammatically on the left-hand side of Fig. 2, these signals being worked by winch-handles k k, one on each side of the casing, another winch-handle, b', being employed to work the magneto-inductor within the casing. Fig. 5, Sheet IV, represents on its right-hand side a half front elevation, and on its left side a half vertical section, in a plane parallel to the front of this apparatus. Fig. 6, Sheet V, represents a vertical section in a plane at right angles to the front. Fig. 7, Sheet VI, shows on its right side a half-plan of the top of the apparatus, and on its left a half-plan, with the top cover removed; also, Fig. 8, Sheet VI, shows a half-plan of the lower part of the apparatus. Fig. 9, Sheet V, is a view of part of the outside of the casing at its lower part, showing a series of catches, $k^1$, for the reception of a spring-pawl, $k^2$, mounted on the winch-handle k, the purpose of such catches being to hold the winch at any required part of its stroke. Fig. 10, Sheet V, is a side view, and Fig. 11, Sheet V, is an edge view, of one of the plates P within the apparatus, on which is mounted the commutating-lever l; and Fig. 12, Sheet V, is a plan of the lever l. Fig. 13, Sheet VI, is a section through a cap, C, provided on the cover of the apparatus over each of the bell-hammers, worked by the armatures of the electro-magnets $E^1$ and $E^2$. By removing either of these caps C the attendant can introduce his fingers through the hole in the cover and work the bell-hammer to and fro, whereby he causes the anchor connected to it to vibrate, and thus permits the segment $R^1$ or $R^2$ to move in obedience to its bias without influencing the segments at a distant station. Fig. 14, Sheet VII, is a front view, and Fig. 15, Sheet VII, an end view, of apparatus of like kind, in which a number of pairs of semaphore-segments, R, are combined, each pair with a corresponding signal-motor, k, which in this case is a lever, the appropriate knobs T being arranged along the top of the apparatus, and the magneto-inductor (of which one serves for all the repeated parts) being worked by either of the winch-handles b'.

Figure 15:
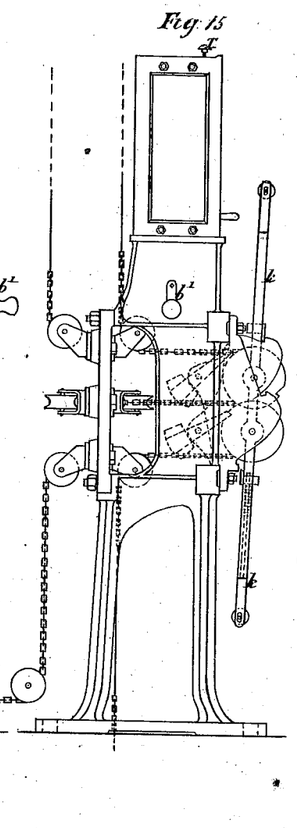

The internal construction of this multiple apparatus is substantially the same as that of the duplex apparatus described above, with a repetition of parts suited to the number of pairs of indicators operated by it. The motor-lever k may be used to work either points or signals. In the latter case they are connected by chains to their respective signals, as shown in Figs. 14 and 15; in the former case they are connected by rods to the points in the usual manner.

Having thus described the nature of our invention, and the best means we know of carrying it into practical effect, we would have it understood that we make no general claim to the actuation of semaphore-arms or signaling apparatus by electricity; but

We claim in respect of electrical signaling apparatus—

1. The toothed semaphore arm or segment $R^1$ $R^2$, biased by a weight or spring to move either upward or downward, in combination with an anchor engaging with its teeth, and connected to the armature of an electro-magnet, which is rendered active by a number of successive and alternating electric currents, whereby the arm or segment, being moved tooth by tooth in obedience to its bias, is not materially affected in its position by accidental or defective currents, or by atmospheric electricity, substantially as herein described.

2. The combination of the said semaphore arm or segment $R^1$ or $R^2$ with a knob or handle, $T^1$ or $T^2$, and its rod for moving a sliding weight, $t^1$ or $t^2$, to give the bias to the arm or segment, and at the same time moving a commutating-lever, $l$, to alter the electric circuits of the apparatus, substantially as herein described.

3. The combination, in one instrument or apparatus, of two sets of biased arms or segments, $R^1 R^2$, and their appropriate knobs or handles $T^1 T^2$, with their rods and commutating-levers $l$, with one magneto-inductor, $b$, and with line-wires $L^1 L^2$, connecting them to distant instruments or apparatus of like kind, substantially in the manner and for the purposes herein set forth.

4. The combination of the biasing and commutating knobs or handles $T^1$ or $T^2$ and their rods with extended rods G, acting, by means of spring-pawls, on point-rods or signal-pulleys, and held down or released by detent-levers L M being engaged with or escaping the axes Z of the arms, substantially as herein described.

5. The combination, in one apparatus, of two or more sets of biased arms or segments, R, and their knobs T, rods and commutators $l$, with extended rods G, acting, in the manner above referred to, on two or more sets of point or signal motors, substantially in the manner and for the purposes herein set forth.

In testimony whereof we have signed our names to this specification in the presence of two subscribing witnesses this 11th day of July, 1874.

ERNST WERNER SIEMENS.
CARL LUDWIG FRISCHEN.

Witnesses as to the signature of CARL LUDWIG FRISCHEN:
    HERMANN KREISMANN,
    BERTHOLD ROI.
Witnesses as to the signature of ERNST WERNER SIEMENS:
    CARL LOEFFLER,
    R. V. F. TREUENFELD.